United States Patent [19]

Wilmot

[11] 4,068,231

[45] Jan. 10, 1978

[54] AUTOMATIC CLUTTER-MAPPER

[75] Inventor: Richard D. Wilmot, Buena Park, Calif.

[73] Assignee: Hughes Aircraft Company, Culver City, Calif.

[21] Appl. No.: 721,628

[22] Filed: Sept. 2, 1976

[51] Int. Cl.² .................................................. G01S 9/02
[52] U.S. Cl. ............................. 343/5 CM; 343/5 VQ
[58] Field of Search .......................... 343/5 CM, 5 VQ

[56] References Cited

U.S. PATENT DOCUMENTS

| 3,325,806 | 6/1967 | Wilmot et al. | 343/5 VQ |
| 3,460,137 | 8/1969 | Ralston | 343/5 VQ X |
| 3,774,202 | 11/1973 | Nolette | 343/5 CM |
| 3,993,994 | 11/1976 | Goggins | 343/5 CM |

FOREIGN PATENT DOCUMENTS

| 953,010 | 8/1974 | Canada | 343/5 VQ |

Primary Examiner—Malcolm F. Hubler
Attorney, Agent, or Firm—W. H. MacAllister; Walter J. Adam

[57] ABSTRACT

A system for detecting the presence of clutter utilizing an area overlap technique that effectively rejects scintillating position clutter near the boundaries of the area clutter map ACM cells. A first area clutter-mapper system is provided with its area ACM cells at a first position and a second clutter-mapper system is provided with its ACM cells in a second position with each cell displaced by about one-half ACM cell dimension in range and azimuth to overlap the original ACM cell boundaries. All of the clutter returns which were divided among the original set of ACM cells occur in one of the area overlap ACM cells so that when the clutter scintillates between ACM cells for any selected detection criterion, it is identified as clutter rather than a moving target. Separate detection history counts for clutter-identification and inhibit code for clutter rejection are provided in both the first and second clutter overlap map units. A clutter rejection code or condition in either area map unit will determine that clutter is present and the control gate samples either the clutter amplitude or a cluster code in both the first and second ACM cell units and rejects target signals if clutter has been determined in either of the units. In one modeling of the concept of invention, it was found that the area overlap method increased the amount of clutter rejected by 55% over a conventional single ACM mapping system unit.

10 Claims, 12 Drawing Figures

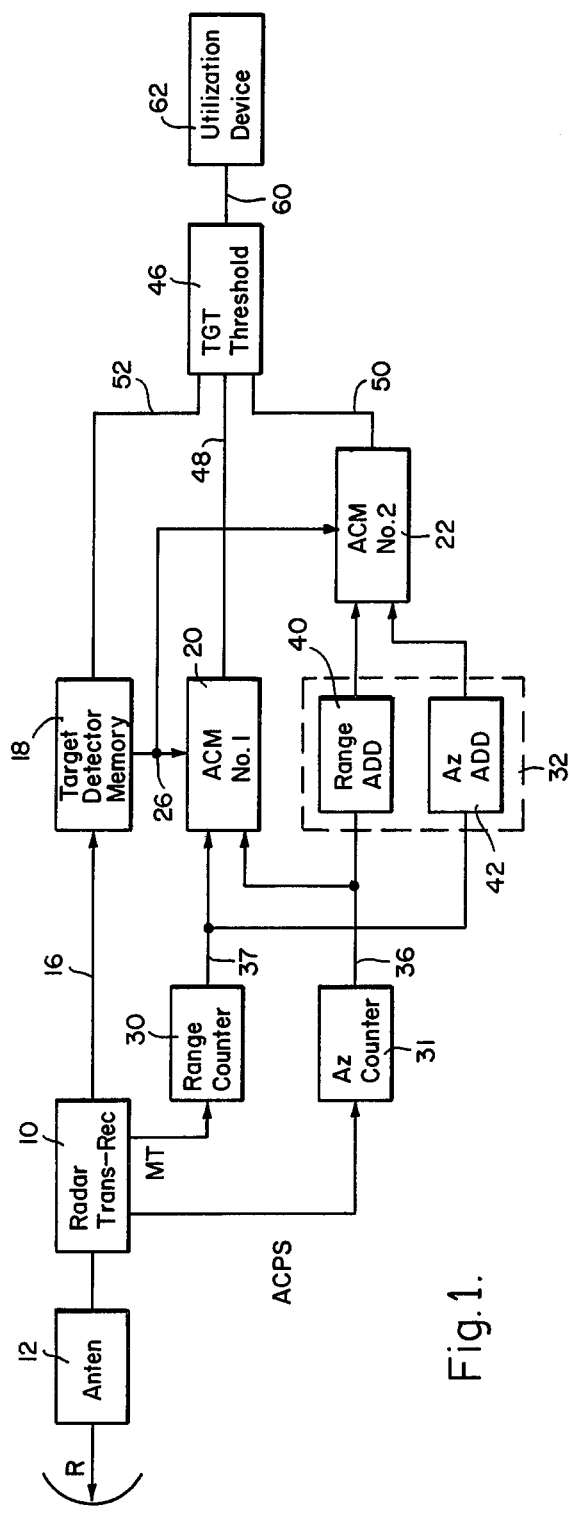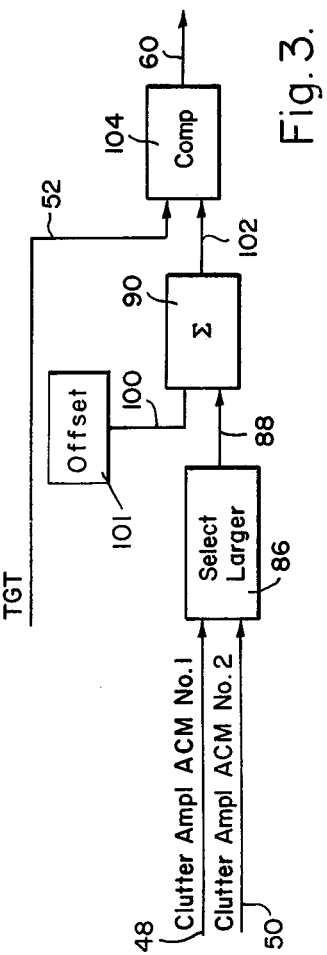

AUTOMATIC CLUTTER-MAPPER

FIELD OF THE INVENTION

This invention relates to a digital video mapping device for use in radar data processing systems and particularly to an improved mapping device that utilizes an area overlap technique for effectively rejecting scintillating position clutter near the boundaries of the area clutter-mapper cells.

DESCRIPTION OF THE PRIOR ART

A number of prior devices have been known which use automatic scan-to-scan correlation or clutter rejection by an automatic clutter-mapper technique such as in U.S. Pat. Nos. 3,325,806 and 3,720,942. An infinite ratio clutter-detecting technique is also shown in patent application Ser. No. 587,176 filed June 16, 1975 and assigned to the same assignee. These systems all recognize stationary clutter by its occurrence in the same automatic clutter-mapper cell from scan-to-scan utilizing various statistical clutter identification criteria, and after the clutter is identified, a threshold is established to reject the clutter. It has been found that during field tests of at least one of these type of systems that the clutter rejection criterion was not being met for certain types of radar environment. An analysis of the clutter returns show that many of the clutter returns which were not rejected were not being detected in the same automatic clutter mapper (ACM) cell consistently. Anomolous radar propagation effects cause the clutter returns to be detected in different ACM cells from scan to scan so that the clutter return did not occur consistently enough in one ACM cell to be identified as clutter so that it could be rejected. This effect was particularly troublesome for clutter which occurred near the edges of ACM cell boundaries because a small variation in the position of the clutter would cause it to consistently appear in different ACM cells. A system that would reject the scintillating position clutter near the boundaries of the ACM cells would substantially increase the percentage of clutter rejection.

SUMMARY OF THE INVENTION

A clutter detection system that utilizes two clutter-mapper systems in which the surveillance area is divided into a number of quantum areas or area clutter mapping cells and determinations are made for each mapping cell as to the occurrence of clutter in that area of space from scan to scan. Each clutter-mapping system operates independently but with the quantum areas of one being overlapped from the quantum areas of the other so as to reject scintillating position clutter near the boundaries of the ACM cells. The second set or overlapping set of ACM cells are displaced by one-half ACM-cell dimension in both range and azimuth so they overlap each of the ACM cells in the first system. All of the clutter returns which are positioned among the original set of ACM cells occur in one of the area overlap ACM cells so that a selected threshold detection of clutter is satisfied to allow rejection of those clutter conditions. The area overlap ACM cells are obtained by delaying the range and azimuth timing signals by one-half of the range of the ACM cell dimension and by one-half of the azimuth of the ACM cell dimensions which may be accomplished by range and azimuth counters. Addressing of both sets of memories is performed in the same manner so that with the range and azimuth timing signal delays, the area overlap ACM cells are shifted with respect to the original ACM cells so that the overlap ACM cells are centered on the boundaries of the original ACM cells. Separate and independent detection history counts for clutter identification and threshold codes for clutter rejection are provided in both the original and in the area overlap maps. A control circuit is provided so that a clutter rejection code in either map will reject the clutter return thus rejecting scintillating clutter that changes position from scan-to-scan. In one arrangement in accordance with the invention, each clutter-mapping system stores a clutter amplitude which is then compared to select the larger for comparison with the amplitude of the target signal. In another arrangement in accordance with the invention, each clutter map stores an inhibit or reject code that is utilized from either clutter map to identify a target as invalid and inhibit its transfer to subsequent utilization circuits.

It is therefore an object of this invention to provide an improved technique in radar automatic clutter mappers to reject scintillating or moving clutter.

It is another object of this invention to provide a clutter detection system that results in a lower and relatively constant false alarm rate.

It is another object of this invention to provide an improved clutter mapper system that identifies clutter with a high degree of accuracy when it occurs near the edges of area clutter mapper cell boundaries and is subject to small variations in the position from scan to scan.

It is a further object of this invention to provide a clutter detection system utilizing area mapping techniques which rejects clutter either from a reject code or by a comparison of detected clutter amplitudes.

BRIEF DESCRIPTION OF THE DRAWINGS

These and other objects, features and advantages of the invention as well as the invention itself will become more apparent to those skilled in the art in the light of the following detailed description taking into consideration with the accompanying drawings wherein like reference numerals indicate like or corresponding parts throughout the several views wherein:

FIG. 1 is schematic block diagram of the area overlap automatic clutter-mapper system in accordance with the invention.

FIG. 3 is a schematic block diagram of the target thresholding arrangement in FIG. 1 responding to the clutter amplitude from the original ACM cells and from the area overlap ACM cells.

FIG. 4 is a schematic diagram of the target thresholding arrangement of FIG. 1 in a second arrangement in accordance with the invention responding to reject codes derived from the original and the area overlap ACM map cells.

DESCRIPTION OF THE PREFERRED EMBODIMENTS

Figure 6:
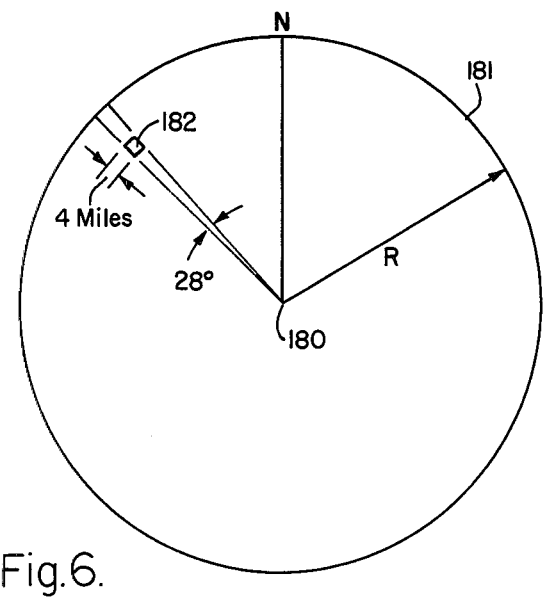
FIG. 6 is a schematic diagram of the clutter-mapping quantum area for further explaining the area division into range sweeps and range bins.

Referring first to FIG. 1, a radar transmitter and receiver unit 10 is provided which may include a antenna 12 transmitting and receiving energy in range sweeps over azimuth positions that may be over an entire 360° or any desired portion thereof. The received energy from each transmitted pulse is received over a plurality of range bins along a selected range R. The video signal provided by the radar transmitter receiver unit 10 for each range bin is then applied in digital form through a composite lead 16 to a target detector memory 18 which may either detect the presence of a target signal above a threshold and utilize that as the on-time target signal or may in some arrangements include a memory utilized for azimuth summing. As is well known in the art for azimuth summing, the presence or amplitude of a target is combined from each range bin over a plurality of radar sweeps and when certain criteria are met for any one range bin the determination is made that a target is present at that particular range-bin time for that sweep. The system in accordance with the invention includes an ACM (area clutter mapper) unit no. 1 as shown by a box 20 and an ACM mapper unit no. 2 as shown by a box 22, each receiving the detected target amplitude on a lead 26 and one arrangement in accordance with the invention and receiving a target code in another arrangement in accordance with the invention. A master trigger signal MT is applied from the radar unit 10 through a range counter 30 and a lead 37, to the mapper unit 20 and is applied through an adder or delay unit 32 to the mapper unit 22. An azimuth position signal is applied through a composite lead 36 through the mapper unit 20 and through the delay unit 32 to the mapper unit 22. In a radar unit utilizing a range-bin counter, the delay unit 32 responds to the clock count from an azimuth counter 31 on the lead 36 by adding a value in a range add unit 40 and when the master trigger signal is an azimuth count value, the azimuth unit 42 responds to the lead 37 to provide the delay in the delay unit 32. A target threshold or selector unit 46 responds to the clutter amplitude for each range bin from the ACM units 20 and 22 through respective leads 48 and 50 and to the target signal in the target detector memory 18 through a composite lead 52 to select the larger clutter amplitude from the two mapper units, compare that with the target amplitude to determine the presence of a valid target. In another arrangement in accordance with the invention where a single bit or a code indicating the presence of clutter is derived from the mapper units 20 and 22, the target selector 46 inhibits the passing of a target signal on the lead 52 if clutter is indicated in either the mapper unit 20 or the mapper unit 22. Targets in the absence of clutter are then applied through a composite lead 60 to a utilization device 62 which may be a display, a processing unit or both, or other units utilizing the target signal as is well known in the art.

Figure 2:
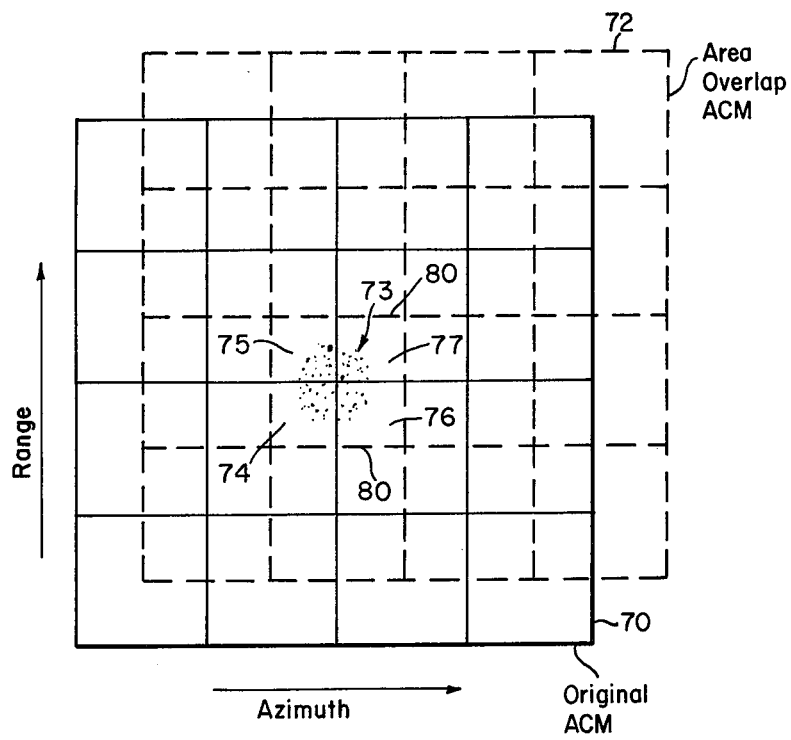
FIG. 2 is a schematic diagram showing the area clutter-mapper cells or quantum areas in the relative position of the original and the area overlap map for a portion of the interrogated area in space.

Referring now to FIG. 2, the relative positions of the original and the area overlap ACM cell pattern will be further explained. An ACM pattern 70 from ACM mapper unit 20 for a portion of the surveillance area, has each of the azimuth and range sectors or areas divided up into substantially equal quantum areas. An area overlap ACM pattern 72 for the same surveillance area is offset in azimuth by one-half of the azimuth width of an ACM cell and is offset in range by one-half of the range distance of an ACM cell. Thus, each cell of the ACM pattern 70 includes substantially a quarter of four ACM cells of the overlap pattern 72. Clutter shown at 73 which is near the edge of the ACM cells of pattern 70 is shown by the dots to fluctuate in position from scan-to-scan between ACM cells 74, 75, 76 and 77 of the first ACM pattern 70. However, in each case, the clutter is still within the second ACM pattern 72 in the ACM cell 80 and may be detected as clutter. Thus, scintillation of the clutter from scan to scan which is moving from one ACM cell to the other of the ACM pattern 70 is detected to a substantially high degree of accuracy in the offset or overlap ACM cell of the pattern 72, and because of the symmetry of the two ACM patterns moving clutter from one cell to the other at the edge of pattern 72 is detected in the original ACM cell of pattern 70.

Referring now to FIG. 3, as well as to FIG. 1, the target threshold unit 46 for the arrangement in which the clutter amplitude is provided on composite leads 48 and 50, includes a select larger signal circuit 86 in which for each range bin the larger clutter amplitude signal is selected and applied through a composite lead 88 to a summing unit 90 also receiving a digital offset value from a source 101 through a lead 100. The offset larger clutter amplitude signal is then applied through a composite lead 102 to comparator 104 which also receives a target amplitude on the composite lead 52 to pass the target signal to the composite lead 60 when the target amplitude is larger than the clutter signal on the lead 102. Thus the target signal is passed to the utilization device when the target amplitude is larger than the bigger clutter amplitude plus the offset.

Referring now to FIG. 4 as well as to FIG. 1, the target threshold circuit for an area clutter-mapping system, in accordance with the invention, utilizing a code or a single bit in each area clutter-mapper unit is shown. The code or bit indicating the presence of clutter is applied from the two area clutter-mapper units 20 and 22 through leads 48 and 50 to an OR gate 106 and in turn through an inverter gate 107 and then to an AND gate 108 also receiving the target signal on the lead 52 to pass the target signal in the absence of clutter to the output lead 60.

Figure 5:
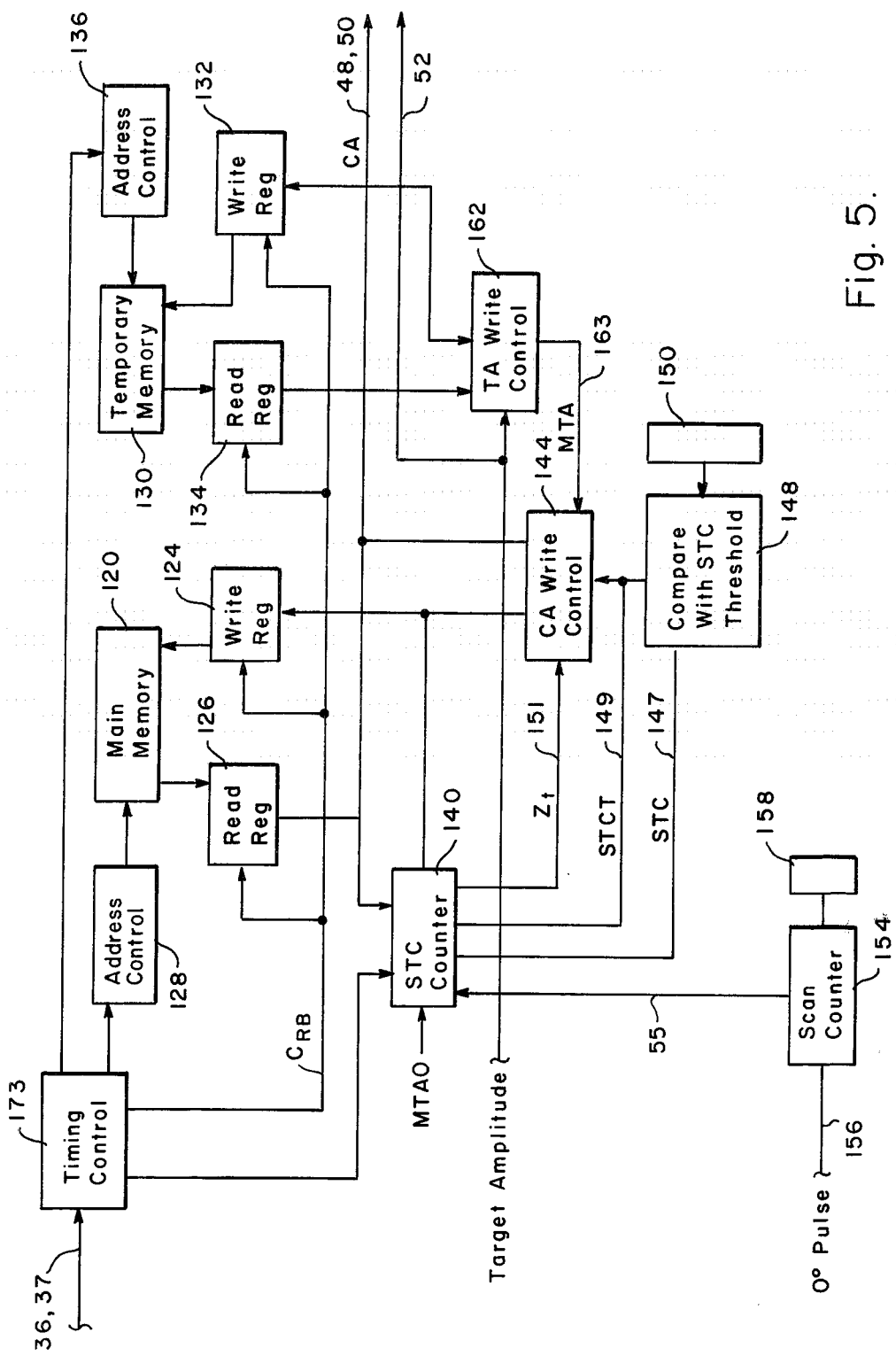
FIG. 5 is a schematic block diagram of the ACM mapping systems as an illustrated arrangement that may be utilized to provide clutter amplitudes in each of the ACM cells.

Referring now to FIG. 5, an area clutter-mapping system to be used in area clutter-mapping units 20 and 22 is illustrated as an example of a clutter-mapping system that provides a clutter amplitude value for comparison. This illustrated clutter-mapper system is shown in pending patent application Ser. No. 587,176, Infinite Ratio Clutter Detecting System, by F. W. Kowalski and R. D. Wilmot filed June 16, 1975, but will be explained for further showing the operation of the improved system in accordance with the invention. The system includes a main memory 120 which may be of any suitable type of memory such as a magnetic storage memory or a dynamic type memory utilizing integrated circuits, for example. The main memory 120 is coupled to a write register 124 and to a read register 126 and is addressed by an address control circuit 128 for accessing any desired storage cell therein. The system also includes a temporary memory 130 which may be of any suitable type such as a magnetic storage memory or a dynamic memory utilizing integrated circuits and coupled to a write register 132, a read register 134 and an address control unit 136. The temporary memory 130 is utilized to store the target amplitude data received on the lead 126 for each of the plurality of area clutter mapper cells. The main memory 120 is utilized principally to store the target detection history or STC count code and the CA or reject code for each of the plurality of ACM mapper cells, which data is utilized to detect the presence of clutter. An STC or clutter counter unit 140 is coupled to the write register 124 and to the read register 126 as well as to the CA or reject code write control unit 144 and a compare circuit 148, the clutter counter 140 principally controlling the clutter count stored in the main memory 120. The compare unit 148 is coupled to the STC counter 140 by a lead 147 as well as to the CA write control unit 144 for determining a signal STCT representing the value of the reject code to be written into the ACM cells of the main memory 120 and which is applied on a lead 149 to the STC counter 140. A last range bin timing pulse $Z_T$ is applied from the STC counter 140 on a lead 151 to the CA write control unit 144 for writing the maximum target amplitude into the memory 120 at the last range bin time of each quantum area. A threshold setting unit 150 which may be manual is coupled to the compare unit 148 for selecting an STC threshold which resets the counter bits. Under certain conditions a scan counter 154 is provided responsive to a zero degree pulse on a lead 156 from the radar system 10 to apply a scan count on a lead 55 to the STC counter 140. A manual unit 158 is provided for manual or automatic control of the scan threshold utilized in the scan counter 154.

A target amplitude or TA write control unit 162 is coupled to the write register 132 and the read register 134 for maintaining the largest amplitude for any target received in any area clutter mapping cell in the temporary memory 30, that memory storing all of the area clutter mapping cells over the distance in one range sweep. The write control unit 162 supplies a maximum target amplitude signal MTA on a composite lead 163 to the reject code write control unit 144. A timing control unit 173 provides system timing in response to pulses from the range counter 30 and azimuth counter 31 of FIG. 1 (or from the delay unit 32), to the STC counter 140, and the address control units 128 and 136. Range bin clock pulses $C_{RB}$ are applied from the timing control unit 173 to the read and write registers 124, 126, 132, and 134.

Referring now to FIG. 6 which shows the clutter map area in a circle 181 or in a portion of a circle, in accordance with the invention from a point 180 which is the location of the surveillance radar system, the entire area is divided up into quantum areas or area clutter mapper (ACM) cells such as 182, each having a dimension of 2.8125° in azimuth and four miles in range as an illustrated size for purposes of explanation. In the illustrated system each scan starts from a north pulse or north position, scanning 360° with a range distance from 0 to 256 miles so that there are 64 area clutter mapping cells such as 182 in the range dimension. In the azimuth dimension for the 2.8125° intervals there are 128 area clutter mapping cells.

Figure 7:
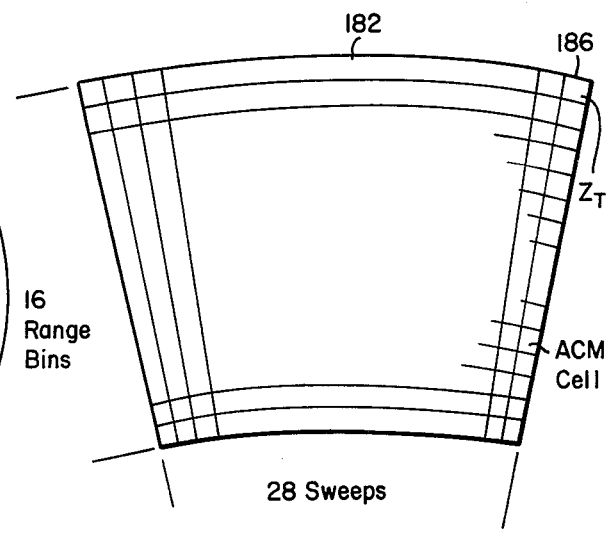
FIG. 7 is a schematic diagram showing a portion of the area and space being mapped for further explaining the operation of the area clutter-mapping cells of the plurality of quantum areas.

Referring now to FIG. 7 which shows a typical ACM cell 182, it includes 16 range bins in the range dimension and 28 radar sweeps in the azimuth dimension. In the illustrated system a range bin represents a quarter mile and in the azimuth dimension each sweep covers an angle equal to 2.8125° divided by 28 or approximately 1/10th of a degree. In the last sweep passing through any ACM cell, the timing signal $Z_T$ is developed in a last range bin 186 for presetting the stored contents in the temporary memory 130 for that cell and for other timing control throughout the system.

Figure 8:
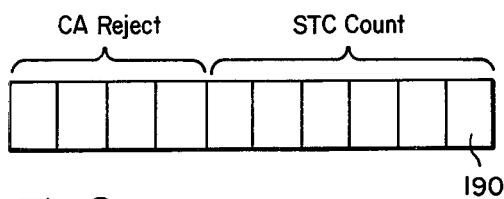
FIG. 8 is a schematic diagram of the stored word in the main memory of FIG. 5 including the clutter amplitude code and the STC or slow time constant count.

Referring now to FIG. 8 a word 190 shows the storage of the CA (clutter amplitude) or reject code in the first four bits in the storage cell of the memory with the STC count stored in the last six bits, this word 190 representing the clutter information stored in the main memory 120 for each ACM cell of the entire surveillance area 181 as shown in FIG. 6. It is to be noted that a single word such as 190 represents the clutter condition in the entire clutter mapping quantum area such as 82 although targets are possibly detected in a number of range bins and in a number of sweeps.

Figure 9:
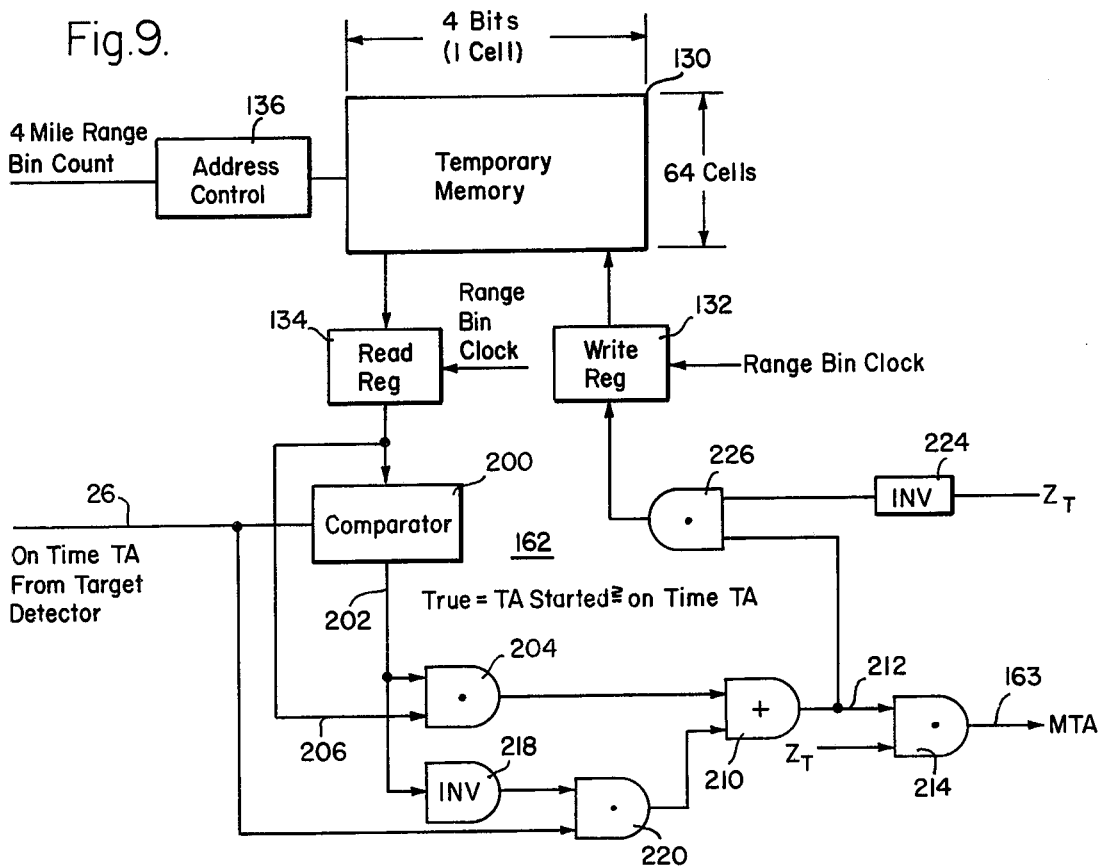
FIG. 9 is a schematic circuit and block diagram of the temporary memory and control logic utilized in the illustrated system of FIG. 5.

Referring now to FIG. 9 which shows the temporary memory 130 and the target amplitude write control unit 162 for determining the maximum target amplitude signal MTA. The address control 136 responds to a pulse representative of the four mile range bin count for continually addressing the storage cell represetative of an ACM cell during the period of 16 range dimensions for storing the maximum target amplitude signals in each of 64 cells, or quantum areas, and has an azimuth dimension of one cell, the total storage being four bits in each ACM cell. The on-time target amplitude signal TA on the lead 26 is applied to a comparator 200 which for every range bin in each sweep receives the stored target amplitude from the temporary memory 130 that represents the entire cell. The read register and the write register each respond to a range bin clock so that reading and writing of the target amplitude signal for the entire ACM cell occurs for each range bin. When the comparison in the comparator 200 is true the stored target amplitude is greater than or equal to the on time target amplitude, a signal is applied through a lead 202 to an AND gate 204 and in coincidence with a stored target of any amplitude applied from the read register 134 through a lead 206, a signal is applied through an OR gate 210 to a lead 212 and in turn through an AND gate 214 also receiving a $Z_T$ timing signal, to apply a maximum target amplitude or MTA signal to the output lead 163. When a comparison is not true on the lead 202, a signal is applied through an inverter 218 to an AND gate 220 so that an on-time target signal TA on the lead 26 causes a signal to be applied through the OR gate 210 and to the AND gate 214 as the maximum amplitude target representing the detection of a larger target in a range bin of the mapping cell. The operation occurs for 28 sweeps by sequentially interrogating in each sweep all 64 ACM cells and at the time of reading the stored word from the range bin of the last sweep for each ACM cell the $Z_T$ signal is true and is applied through an inverter 224 to the AND gate 226 which writes zeros into that cell of the memory 130 through the write register 132 so as to clear the temporary memory for the next scan position. Prior to this $Z_T$ time range bin, the AND gate 226 responds to the signal on the composite lead 212 to write the maximum target amplitude into the temporary memory 130 for each range bin.

Figure 10:
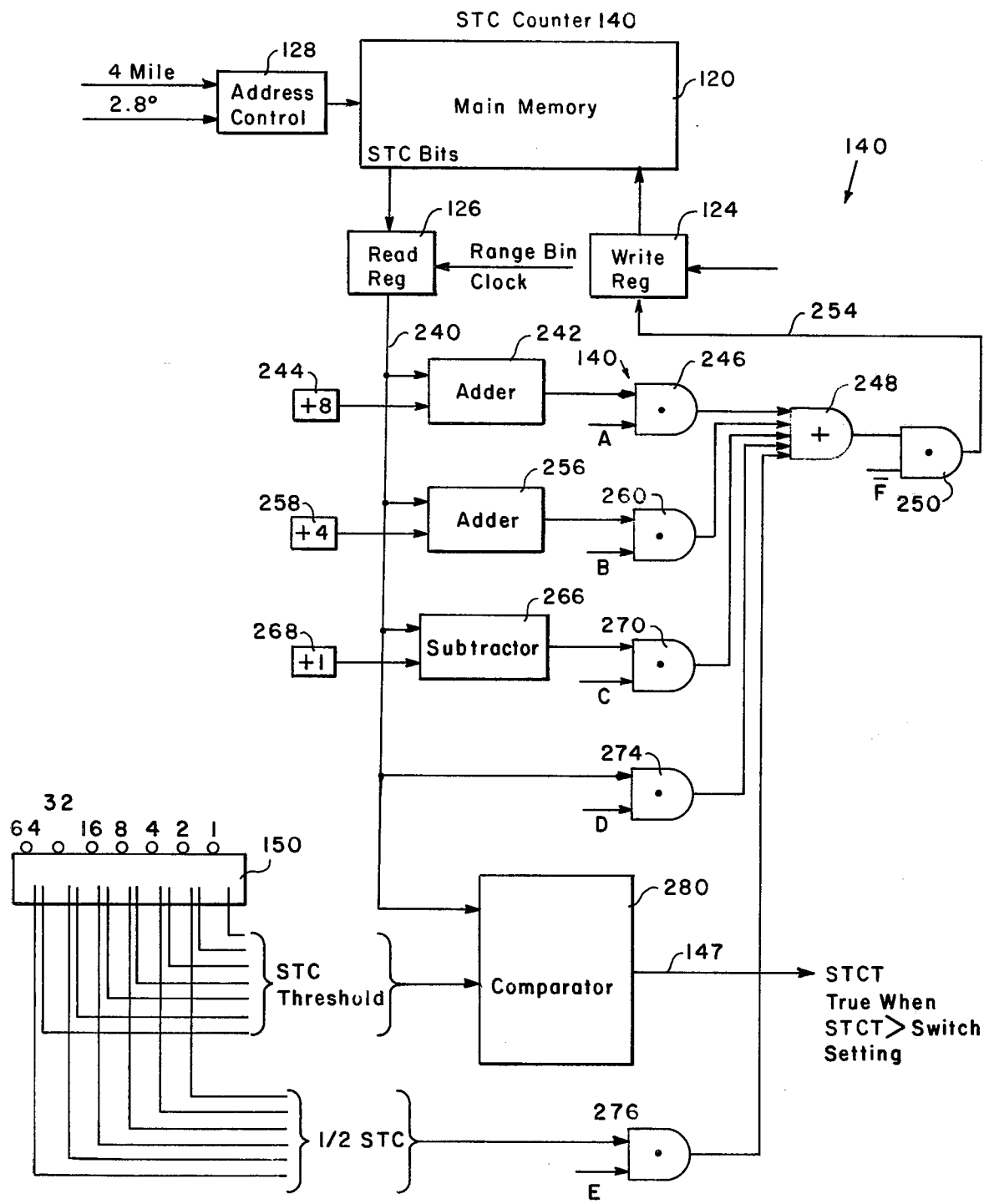
FIG. 10 is a schematic block and logical diagram for explaining the STC or target counter as well as the target compare circuit in the illustrated system of FIG. 5.

Referring now to FIG. 10 the STC or target counter unit 140 will be explained relative to the operation of the main memory 120. The write register 124 and the read register 126 both operate in response to a range bin clock to read and write during each range bin of each sweep of each of the ACM cells. The address control unit 128 responds to a four mile signal and a 2.8125° azimuth signal for addressing a single cell in the main memory 120 representative of the stored reject code and the STC count for that ACM cell. The STC count read from the main memory 120 during each range bin is applied to a lead 240 and for incrementing stored STC count during the first or clutter searching mode an adder 242 is coupled to the lead 240 for receiving the stored count and to a source 244 of the binary value of decimal +8 to apply the increased count to an AND gate 246 which in coincidence with an A term applies the count to an OR gate 248 and in turn to an AND gate 250. In the presence of an $\overline{F}$ term applied to the AND gate 150 indicating that the count is not to be set to zero, the increased or other count is applied through a lead 254 to the write register 124 for being written into that ACM cell during that range bin period. During any range bin period for incrementing the stored count by four which occurs in mode 2 which is the searching for clutter amplitude change when the stored reject code is greater than zero, an adder 156 is coupled to the lead 240 and receives a +4 value from a source 258 to apply the increased count to an AND gate 260 which in coincidence with a B term applies the increased count to the OR gate 248 for being written into the memory 120. For decrementing by one the stored count during any range bin which occurs in mode 2 for a stored reject code greater than zero and a target amplitude less than that of the reject code, a subtractor 266 is coupled to the lead 240 and to a +1 value source 268 to apply a decremented count to an AND gate 270 which in coincidence with a C term applies the decrementative count to the OR gate 248 for being written into the main memory 120. For mode 1 operation with the absence of a target in the temporary memory or for mode 2 with the target amplitude equalling the amplitude of the reject code, and AND gate 274 is coupled to the lead 240 to provide no change to the stored target count in the presence of a D term and to apply the same value to the OR gate 248 to be written into the main memory 120. When it is desired to set the target count to one-half of the STC threshold and AND gate 276 receives a one-half STC threshold value from the threshold setting unit 150 and in coincidence with a term E, writes this one-half threshold count into the main memory 120. For determining the STCT signal which is true when the stored STC count equals the STC threshold from the unit 150 a comparator 280 is coupled to the lead 240 and applied an STCT signal to an output lead 147. The comparator 280 may be formed from a Fairchild semiconductor comparator five bit 93L24 interconnected as recommended in the *TTL Applications Handbook of Fairchild Semiconductors* dated August 1973.

The $Z_T$ timing signal is generated by an AND gate (not shown) receiving inputs from a first input AND gate responding to the least to the most significant bits of the 16 range bin count for each sweep of each ACM cell, and from a second input AND gate responding to the least to the most significant bits of a sweep count representing the 28 sweeps of an ACM cell. The output of the first AND gate represents the last range bin of each ACM cell and the output of the second AND gate represents the last sweep of each ACM cell. The STC counter terms A to F, utilized in FIG. 10 may be provided by logic circuits interchanged in accordance by any suitable arrangement as is well known in the art to provide the following logical relationships:

| | | | | | |
|---|---|---|---|---|---|
| (+8) | A = $\overline{(SCT)}$ | (CAO) | $\overline{(MTAO)}$ | $(Z_T)$ | |
| (+4) | B = $\overline{(CAO)}$ | (MTG) | $(\overline{Z_T})$ | | |
| (−1) | C = $\overline{(CAO)}$ | (MTL) | $(\overline{Z_T})$ | | |
| (0) | D = (CAO) | $\overline{(MTE)}$ | $(\overline{Z_T})$ + $\overline{(SCT)}$ | (CAO) | (MTAO) $(Z_T)$ |
| (Set STC to ½ of STC threshold | E = (CAO) | (MTAO) | (STCT) $Z_T$[Clutter presence detected] | | |
| | + $\overline{(CAO)}$ | (MTG) | (STCT) $Z_T$[Clutter amplitude decrease detected] | | |
| | + $\overline{(CAO)}$ | (MTL) | (STCO) $Z_T$[Clutter amplitude decrease detected] | | |
| (Resets to 0) | F = (CAO) | (SCT) | $Z_T$ + $\overline{(CAO)}$ | (MTAO) (STCO) | $Z_T$[Clutter faded] |

The CAO term for the STC counter 140 indicating that the reject code is zero, may be formed in a suitable AND gate receiving the stored CA bits CA1, CA2, CA3 and CA4 from the main memory after being applied through respective inverters 255 to 258. The MTAO signal (indicating that the maximum target amplitude is zero) which may be considered in the write control circuit 62, may be developed from the TA bits from the temporary memory TA1, TA2, TA3 and TA4. The count or STC bits S1, S2, S3, S4, S5 and S6 may be applied through suitable inverters (not shown) to AND gate for developing the signal STCO indicating that the STC count is equal to zero. A suitable comparator (not shown) responds during each range bin period to the target amplitude signals TA1, TA2, TA3 and TA4 and to the reject code CA1, CA2, CA3 and CA4 to develop the signal MTG which is true when TA is greater than CA, the signal MTE which is true when TA equals CA and MTL which is true when TA is less than CA.

Figure 11:
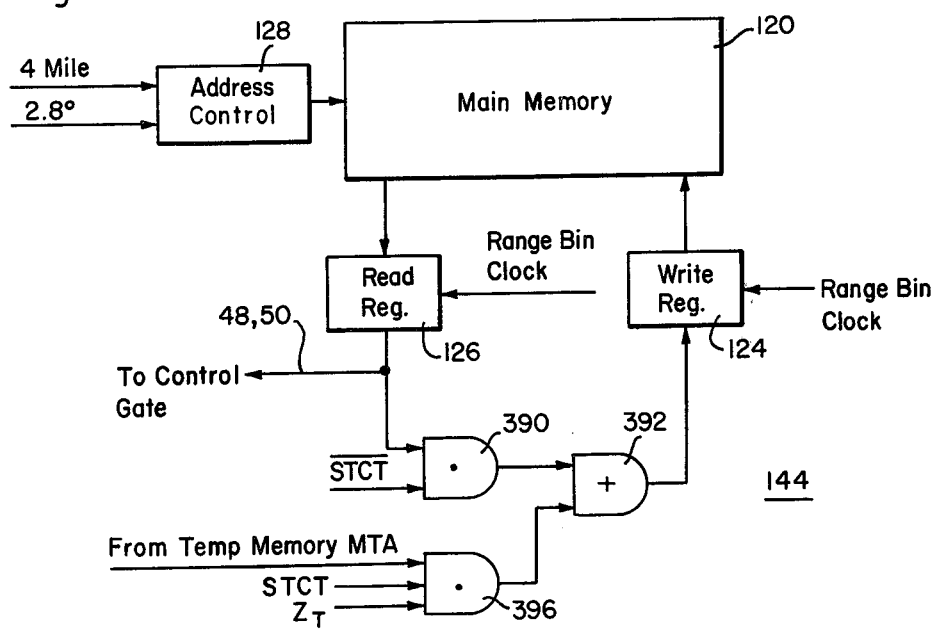
FIG. 11 is a schematic block diagram further explaining the target counter of FIG. 10.

Referring now to FIG. 11, the CA write control circuit 144 has an AND gate 390 responding during each range bin period to the CA code from the read register 126 and the signal $\overline{STCT}$ indicating the absence of target count having reached its threshold, to apply the reject code through an OR gate 392 to be written into the main memory 120 through the write register 124 during that range bin period. The CA signal supplied to the target threshold circuit 46 of FIG. 1 is applied thereto through the leads 48 and 50 for rejecting target signals in the presence of clutter. An AND gate 396 responds to the maximum target amplitude signal MTA, the signal STCT indicating the target count has reached its threshold and the timing signal $Z_T$ to write the maximum target amplitude into the main memory 120 from the temporary memory at time $Z_T$.

Referring now principally to FIG. 5, the operation of the automatic clutter system will be explained in further detail. The following table shows the control of the clutter count and of the reject code CA in the memory 120 for both searching for the presence of clutter in mode 1 and for searching for clutter amplitude changes in mode 2.

| MAIN MEMORY WRITE AT $Z_T$ TIME | | |
|---|---|---|
| STC | Searching for Clutter - Mode 1 | Searching for Clutter Amplitude Change |
| | For Stored CA = 0000 Increment by 8 for MTA in temp. mem. ≠ 0000- Recirculate CA = 0000 | For Stored CA ≠ 0000 Increment by 4 for TA>CA. If STC threshold is reached, write new MTA into CA. |
| | If increment of STC causes STC threshold to be exeeeded, set STC to ½ threshold- write MTA into CA. | No change if TA = CA |
| STC | No increment if MTA in temp. mem. = 0000. If scan count = max. (44), reset STC to 0-Recirculate CA = 0000. | Decrement by 1 if TA>CA. At STC = 0, write new TA into CA. If new TA = 0000 (clutter gone) revert to Mode 1. |

In the first mode when CA equals 0000 the A logic increments the STC word by eight for the largest target amplitude in the temporary memory and recirculates the reject code CA equal to 0000. When the word STC is incremented to cause it to reach the STC threshold the STC word is then set to one-half threshold by the E logic and the MTA is written into the main memory at that quantum area cell for the CA reject code. If there are no detections of a target for an area cell, the MTA in the temporary memory is equal to 0000 and the STC word is not incremented. If the scan count equals its maximum value of 44, the STC word is reset to zero. Also, for this condition, the CA reject code 0000 is recirculated.

For a stored reject code CA which is not equal to 0000 indicating the system is searching for clutter amplitude change, the STC word is incremented by four as a result of the B logic when the target amplitude is greater than CA. When the STC threshold for any area cell is reached, a new MTA is written into main memory as the CA reject code. The STC count is not changed if the target amplitude equals the value of the CA reject code. The STC count is decremented by one in the mode 2 if target amplitude is less than CA which is performed by the C logic as previously described.

The following example shows the operation of the system for a scan count of 44 showing the value of the target amplitude TA, target count STC and the reject code CA.

| EXAMPLE: SCAN COUNTER & SCAN NUMBER | | TA | STC | CA |
|---|---|---|---|---|
| Mode I | 1 | 0000 | $0_{(10)}$ | 0000 |
| | 2 | 0011 | $8_{(10)}$ | 0000 |
| | 3 | 0011 | $16_{(10)}$ | 0000 |
| | 4 | 0011 | $24_{(10)}$ | 0000 |
| | 5 | 0011 | $32_{(10)}$ | 0000 |
| Clutter | 6 | 0011 | $40_{(10)} \to 20_{(10)}$ | 0000→0011 |
| Detected | 7 | 0011 | $20_{(10)}$ | 0011 |
| | 8 | 0011 | $20_{(10)}$ | 0011 |
| | 9 | 0011 | $20_{(10)}$ | 0011 |
| | 10 | 0101 | $24_{(10)}$ | 0011 |
| | 11 | 0101 | $28_{(10)}$ | 0011 |
| | 12 | 0101 | $32_{(10)}$ | 0011 |
| | 13 | 0101 | $36_{(10)}$ | 0011 |
| Clutter TA Increase Detected | 14 | 0101 | $40_{(10)} \to 20_{(10)}$ | 0011→0101 |
| | 15 | 0101 | $20_{(10)}$ | 0101 |
| | 16 | 0101 | $20_{(10)}$ | 0101 |
| Mode II | 17 | 0001 | $16_{(10)}$ | 0101 |
| | 18 | 0001 | $12_{(10)}$ | 0101 |
| | 19 | 0001 | $8_{(10)}$ | 0101 |
| | 20 | 0001 | $4_{(10)}$ | 0101 |
| Clutter TA Decrease Detected | 21 | 0001 | $0_{(10)} \to 20_{(10)}$ | 0101→0001 |
| | 22 | 0001 | $20_{(10)}$ | 0001 |
| | 23 | 0001 | $20_{(10)}$ | 0001 |
| | 24 | 0001 | $20_{(10)}$ | 0001 |
| Mode II | 25 | 0000 | $16_{(10)}$ | 0001 |
| | 26 | 0000 | $12_{(10)}$ | 0001 |
| | 27 | 0000 | $8_{(10)}$ | 0001 |
| | 28 | 0000 | $4_{(10)}$ | 0001 |
| Clutter Fade Detected | 29 | 0000 | 0→0 | 0001→0000 |
| | 30 | 0000 | 0 | 0000 |
| | 31 | 0000 | 0 | 0000 |
| | 32 | 0000 | 0 | 0000 |
| | 33 | 1111 | $8_{(10)}$ | 0000 |
| Valid Target Present | 34 | 1111 | $16_{(10)}$ | 0000 |
| | 35 | 1111 | $24_{(10)}$ | 0000 |
| | 36 | 0000 | $24_{(10)}$ | 0000 |
| | 37 | 0000 | $24_{(10)}$ | 0000 |
| | 38 | 0000 | $24_{(10)}$ | 0000 |
| Mode I | 39 | 0000 | $24_{(10)}$ | 0000 |
| | 40 | 0000 | $24_{(10)}$ | 0000 |
| | 41 | 0000 | $24_{(10)}$ | 0000 |
| | 42 | 0000 | $24_{(10)}$ | 0000 |
| | 43 | 0000 | $24_{(10)}$ | 0000 |
| Scan Counter Threshold Reached | 44 | 0000 | $24_{(10)} \to 0_{(10)}$ | 0000 |

In this example the STC threshold is 40 and the mid-range STC threshold setting is 20 with the example being for a single ACM cell in the clutter mapper memory 20. During scans one to five which is operation in mode 1 input target signals TA are detected while CA remains 0000 until scan 6 at which time the STC count reaches the STC threshold of 40 and is reset to 20 with the maximum target amplitude being written into the main memory as the CA code of 0011. The operation which during scan 6 goes into the second mode or clutter amplitude detection mode continues to scan 14 at which time the STC count again reaches the threshold is set to half of its threshold value and a new reject code 0101 is written into the main memory for that clutter mapper cell. The STC count is again increased by 8 as a result of target signals being received until at scan 21 the STC threshold is again reached the STC count being reset to half of threshold and a new CA reject code of lesser amplitude being written into the main memory. At this point in time, the clutter signals decrease or the clutter received by the radar is starting to fade and at scan 29 the STC count has been decremented by one until it reaches zero and the reject code CA is set to 0000 so that the operation goes back into mode 1 for clutter searching. During scans 33, 34 and 35, valid targets are present but the STC count only increases to decimal 24 and the system remains in the mode 1 operation for that clutter mapper cell. At scan 44 the scan counter threshold is reached and the STC count is reset to zero and the CA reject code of 0000 is recirculated. It is to be noted that the scan counter threshold resets the STC count only in mode 1. The operation continues for that ACM cell from this point with a new scan count of one.

The illustrated example of FIG. 5 provides clutter amplitude CA which is utilized in each ACM mapper unit 20 and 22 of FIG. 1 to inhibit invalid targets. However, the principles of the invention are not limited to any particular clutter determining system and may use any suitable arrangement such as a statistical clutter count of two out of three or four out of five for clutter detection or a clutter amplitude averaging technique with scan to scan smoothing.

Figure 12:
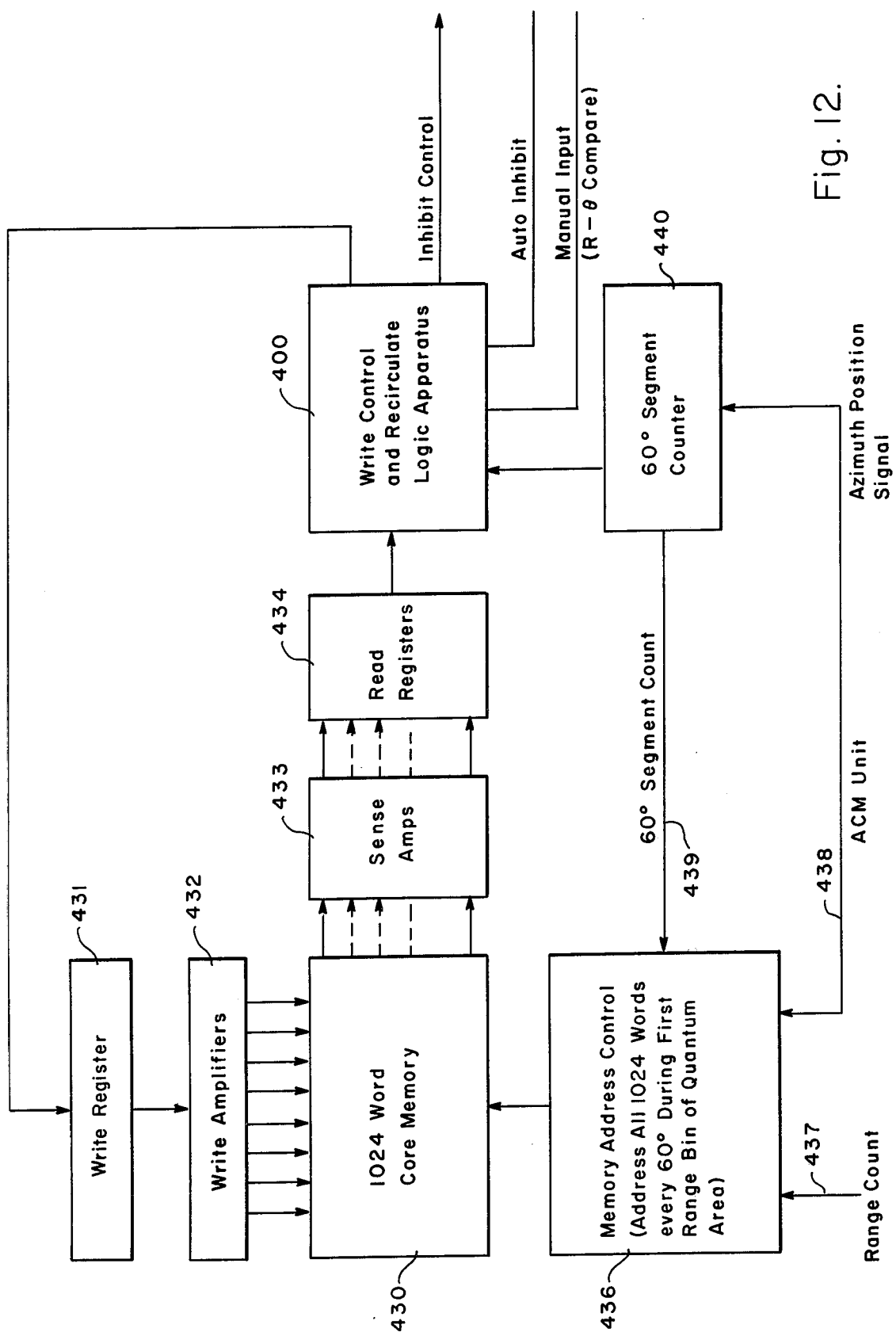
FIG. 12 is a schematic block diagram showing an ACM mapper arrangement in accordance with the invention utilizing a reject code or bit that may be utilized in each target mapper unit of FIG. 1 for inhibiting clutter.

In another arrangement, in accordance with the invention, each ACM mapper unit may provide an inhibit bit with either bit inhibiting a target signal as shown in FIG. 4. An illustrative example of a mapper system that provides a single inhibit bit for each quantum area is shown in FIG. 12 which is shown in further detail in U.S. Pat. No. 3,325,806, Video Mapping Device by R. D. Wilmot et al, issued June 13, 1967. The clutter mapper unit operates in response to target and no target reports generated by the target detector memory 18 of FIG. 1 and utilized in a write control and recirculate apparatus 400. The ACM unit may include a core memory 430 having associated write register 431, write amplifier 432 together with sense amplifier 433 and read register 434.

The core memory 430 has, by way of example, 1024 words each of 12 bits. Two bits of the 12 bits in each of the 1024 words are allocated to a 60° segment of the visual display. Thus, for example, bits 1, 2; 3, 4; 5, 6; 7, 8; 9, 10; and 11, 12 of each 12-bit word are allocated to the 60° segments 1, 2, 3, 4, 5 and 6, respectively, of the area. Further, the 1024 words of the memory 430 are divided into 16 groups of 64 words each. Each of the 16 groups represents a single quantum sector which is 1/16 of 60° or 3.75° in azimuth. In the surveillance radar as illustrated, the range is 160 miles. Thus, the 64 words in each 3.75° sector correspond to 160 miles, whereby each quantum area is 2.5 miles in range. It is, therefore, evident that the core memory 430 divides up the entire visual display into quantum areas 3.75° in azimuth and 2.5 miles in range with two bits in each word being allocated to each quantum area in the display.

The core memory 430 is programmed by a memory address control 436 which operates in response to a range count input signal and an azimuth position signal available on leads 437 and 438, respectively, from the radar transmitter-receiver 10 and in response to a 60° segment counter 440. The 60° segment counter 440, in turn, operates in response to the azimuth position signal available from the radar transmitter-receiver 10. In general, the memory address control addresses the 1024 words of memory 30 every 60°, with each group of 64 words being addressed by the number of times that there are azimuth sweeps in each quantum area of the visual display before proceeding to the next group of 64 words. By way of example, a typical radar system has one azimuth sweep for each 0.1° through each quantum area of the visual display.

To create the proper timing for the memory recirculation, the memory address control 436 delays the write address by one count from the read address. This means that during the first range bin of the quantum area the data in a word $m$ is transferred from the memory 430 to the read registers 434, and during this same clock period, the data in the write register 431 is written into memory 430 at address $(m-1)$ because the data contained in write register 431 was sampled in the last range bin of the previous quantum area whose address was $(m-1)$.

The write control and recirculate logic apparatus 400 operates in response to a 60° segment count signal from 60° segment counter 440 and from target reports from target detector memory 218. The apparatus 400 recirculates without change each word of the core memory 430 corresponding to the five 60° segments of the visual display not being updated back to the write register 431. During the updating scans, the two bits in each word of the core memory 430 corresponding to the segment under surveillance are passed through recirculate logic, and returned to write register 431 of core memory 430. The two bits corresponding to the segment of the visual display being updated are designated as "$A_n$-recirculate" and "$B_n$-recirculate." The $B_n$-recirculate signal constitutes information concerning the initial appearance of one or more targets in the quantum areas of 3.75° sectors of the 60° segment and is used only in the automatic mode of operation. The $A_n$-recirculate signal, on the other hand, constitutes inhibit information for both the automatic and manual operation. The operation of this type of ACM mapper unit is further explained in the above-referenced U.S. Pat. No. 3,325,806 and will not be explained in further detail. The inhibit control of $A_n$-recirculate bit from each ACM mapper unit of FIG. 1 is applied to the OR gate 106 of FIG. 4 to inhibit clutter from passing through the AND gate 108.

Thus, there has been described an area overlap mapper system that rejects scintillating position clutter near the boundaries of the ACM cells. The principles of the invention are not limited to any particular type of ACM mapper unit and further may operate either by a comparison of mapper clutter amplitude or of inhibit bit or bits indicating clutter in certain area mapping cells. The overlap mapping concept in accordance with the invention has been found to substantially increase the amount of rejected clutter. The concepts of the invention are illustrated in a surveillance radar system but are equally applicable to any type of suitable system other than surveillance type and are applicable to radar or any interrogating system such as a laser systems or infrared systems.

What is claimed is:

1. A system for determining the presence of clutter over an area responsive to a target detector comprising
   first area mapping means for defining a first group of mapping cells over said area in range and azimuth,
   second area mapping means for defining a second group of mapping cells over said area, offset from said first group in both range and azimuth, and
   target threshold means coupled to said first and second mapping means and to said target detector for controlling the passing of targets.

2. The system of claim 1 in which each first and second mapping means are coupled to said target detector and determines the presence of clutter in the corresponding group of mapping cells.

3. The system of claim 2 in which the clutter amplitudes are stored in the mapping cells of the first an second groups and said target threshold means includes means to compare the clutter amplitudes for each mapping cell and to compare the maximum amplitude with the target amplitude.

4. The system of claim 2 in which a code representing the presence of the predetermined clutter condition is stored in the mapping cells of said first and second groups and said target threshold means includes means to select either code to inhibit the selection of a target signal from said target detector.

5. The system of claim 2 in which said first and second groups are overlapped substantially one-half of a mapping cell length in range and substantially one-half of a mapping cell width in azimuth.

6. A clutter mapping system for determining the presence of clutter over a surveillance area comprising
- a source of target signals, for detecting the presence of a target during each range bin of a plurality of azimuth sweeps,
- first area clutter mapping means for defining a first area clutter mapping pattern of cells, each cell including a predetermined number of range bins over a predetermined number of azimuth sweeps,
- second area clutter mapping means for defining a second area clutter mapping pattern of cells of substantially the same number of range bins and azimuth sweeps of said first pattern, said second pattern positioned relative to said surveillance area to be offset a selected portion of a cell in both the range and azimuth dimensions, and
- threshold means coupled to said first and second area clutter mapping means and to said source of target signals for determining the presence of targets.

7. The system of claim 6 in which said first and second mapping means includes means for establishing said offset of a selected portion equal to substantially one-half of the number of range bins and one-half of the number of azimuth sweeps of each cell.

8. The system of claim 7 in which said first and second area clutter mapping means includes means for storing clutter amplitude for each cell.

9. The system of claim 7 in which said first and second area clutter mapping means includes means for storing an inhibit code representative of clutter in each cell.

10. The combination of claim 8 in which said threshold means includes means for comparing the clutter amplitude for each cell from said first and second mapping means to select the larger value and for comparing the larger value with the amplitude of said target signals.

* * * * *